US012599149B2

(12) United States Patent
Kitawaki et al.

(10) Patent No.: US 12,599,149 B2
(45) Date of Patent: Apr. 14, 2026

(54) OILY FOOD FOR FROZEN DESSERTS

(71) Applicant: FUJI OIL CO., LTD., Osaka (JP)

(72) Inventors: Maki Kitawaki, Ibaraki (JP); Yukako Yokohigashi, Ibaraki (JP); Hideki Motoike, Ibaraki (JP)

(73) Assignee: FUJI OIL CO., LTD., Osaka (JP)

( * ) Notice: Subject to any disclaimer, the term of this patent is extended or adjusted under 35 U.S.C. 154(b) by 162 days.

(21) Appl. No.: 18/262,075

(22) PCT Filed: Mar. 15, 2022

(86) PCT No.: PCT/JP2022/011506
§ 371 (c)(1),
(2) Date: Jul. 19, 2023

(87) PCT Pub. No.: WO2022/209841
PCT Pub. Date: Oct. 6, 2022

(65) Prior Publication Data
US 2024/0298666 A1      Sep. 12, 2024

(30) Foreign Application Priority Data

Mar. 30, 2021     (JP) ................................ 2021-056627

(51) Int. Cl.
*A23G 9/32*          (2006.01)
*A23G 9/34*          (2006.01)
*A23G 9/48*          (2006.01)
(52) U.S. Cl.
CPC ............. *A23G 9/327* (2013.01); *A23G 9/322* (2013.01); *A23G 9/34* (2013.01); *A23G 9/48* (2013.01)

(58) Field of Classification Search
CPC .......... A23G 9/327; A23G 9/322; A23G 9/34; A23G 9/48
USPC ......................................................... 426/609
See application file for complete search history.

(56) References Cited

U.S. PATENT DOCUMENTS 6,902,752 B1      6/2005   Kitano et al.
2008/0089995 A1   4/2008   Okochi et al.

FOREIGN PATENT DOCUMENTS

JP        2720747 B2  *  3/1998
JP        2013-201990 A    10/2013
JP        2014-187919 A    10/2014
JP        2017042087 A  *   3/2017
JP        2017-121191 A     7/2017
WO        2000/076328 A1   12/2000
WO        2006/080418 A1    8/2006

OTHER PUBLICATIONS

Translation of JP-2017042087-A (Year: 2017).*
Translation of JP-2720747-B2 (Year: 1998).*
International Search Report mailed on May 24, 2022 for PCT/JP2022/011506.

* cited by examiner

*Primary Examiner* — Brent T O'Hern
(74) *Attorney, Agent, or Firm* — Rankin, Hill & Clark LLP

(57) ABSTRACT

An object of the present invention is to provide an oily food that imparts an unprecedented characteristic texture in frozen dessert applications. By containing a sucrose fatty acid ester having an HLB of 3 or less and saccharides and setting the particle size of the solid content to a specific size or more, an oily food for frozen desserts having a new texture with quality defects having been improved can be obtained.

7 Claims, No Drawings

OILY FOOD FOR FROZEN DESSERTS

TECHNICAL FIELD

The present invention relates to an oily food for frozen desserts having a new texture.

BACKGROUND ART

Frozen dessert products such as ice cream may be coated with oily foods such as chocolates in order to provide a variety of flavors, avoid moisture transfer, and impart a texture, and are highly popular products in the market. Therefore, it is necessary to further meet new demands of consumers, and various variations have been attempted in order to make the product more attractive.

However, although various variations are attempted, currently, it is common to provide a variety of flavors to oily foods to be coated, or to attach edible food such as a nut and baked goods to milk chocolate or the like having high versatility, and such studies have been made (Patent Literature 1). However, oily foods having a more different texture cannot be provided.

As one of methods for providing a new texture, a method of adjusting the particle diameter of the solid content in the oily food is considered. A general oily food includes a step of grinding the solid content to a certain particle diameter or less, and has a smooth texture. On the other hand, by minimizing the grinding step, it is possible to obtain a crispy texture in which the texture of the particles themselves is felt. This crispy texture is different from the oily food in which the above-mentioned edible food such as the nut is partially present.

In order to achieve a crispy texture (hereinafter referred to as crispness), a material called glaze coating can be used as the oily food in a normal temperature range. These are used because, in addition to crispness, they have less stickiness when coated on bread than sugar-based ones such as fondant and icing which are generally known (Patent Literature 2).

There is a description of the oily food having crispness at normal temperature and achieving both high heat resistance and melting in the mouth (Patent Literature 3). When this invention is used for the frozen desserts, it was expected that a new material that is well melted in the mouth and has a crispness even under freezing can be produced.

CITATION LIST

Patent Literature

Patent Literature 1: JP-A-2014-187919
Patent Literature 2: WO 2000/076328 A
Patent Literature 3: WO 2006/080418 A

SUMMARY OF INVENTION

Problems to be Solved by Invention

An object of the present invention is to provide an oily food that imparts an unprecedented crispy and characteristic new texture in frozen dessert applications.

As a result of studies conducted by the inventors in order to apply glaze coating to the frozen desserts, it has been found that a thickening phenomenon caused by mixing of moisture is more remarkable than the conventionally known milk chocolate and the like described in Patent Literature 1. Patent Literatures 2 and 3 do not mention them, and it has been found that restraining of thickening is a new problem in applying glaze coating to the frozen desserts.

That is, in the present invention, for the purpose of providing the oily food for frozen desserts that imparts an unprecedented characteristic texture, which has been an initial problem, it has been newly found that a specific problem is to solve thickening due to moisture contamination and accompanying quality defects.

Solution to Problems

With reference to the background art, the inventors conducted intensive studies, but it was not clear as to what a specific problem is for using glaze coating, that provides crispness as a characteristic texture, for the frozen desserts. The oily food has a composition in which sugar, cacao, dairy products, and the like are dispersed in a continuous layer of oil, and is substantially free of water. However, in the production process of the frozen dessert coated with the oily food, the frozen dessert is often produced by coating the oily food on the surface of the frozen dessert, for example, by directly dipping the food that has been cooled to a low temperature, which is the "core material" such as an ice cream and an ice dessert, in the oily food, and at that time, it is inevitable that a trace amount of moisture is mixed into the oily food from the frozen dessert. Due to this moisture, the oily food is gradually thickened, and there is a possibility that uniform coating is difficult. However, when conventionally known milk chocolate or the like is industrially produced, a new oily food in which moisture is not mixed is always supplied, and thus a large problem does not occur. Further, the glaze coating is used for baked goods and bakery materials, which are eaten at room temperature. Therefore, it has been considered that application to the frozen desserts is also relatively easy.

As a result of intensive studies, the present inventors have found that by containing a sucrose fatty acid ester having a hydrophilic-lipophilic balance (HLB) of 3 or less and saccharides and setting the particle size of the solid content to a specific size or more, the oily food for frozen desserts having a new texture in which the thickening and accompanying quality defects such as sticking are improved can be obtained, and more preferably dextrins is contained, and have completed the present invention.

That is, the present invention includes:

(1) An oily food for frozen desserts, containing a sucrose fatty acid ester having an HLB of 3 or less and saccharides, and having a solid content particle size of 50 μm or more and an oil content of 25 to 70 wt. %;
(2) The oily food for frozen desserts according to (1), containing dextrins;
(3) The oily food for frozen desserts according to (1) or (2), in which a main constituent fatty acid of the sucrose fatty acid ester is an unsaturated fatty acid having 16 or more carbon atoms;
(4) The oily food for frozen desserts according to (1) or (2), in which a content of lecithin is 0.05 wt. % or less;
(5) The oily food for frozen desserts according to (2), in which a content of lecithin is 0.05 wt. % or less, and a constituent fatty acid of the sucrose fatty acid ester is an unsaturated fatty acid having 16 or more carbon atoms;
(6) A frozen dessert coated with the oily food according to any one of (3) to (5); and
(7) A method for imparting a new texture to frozen desserts, the method including coating, kneading, or dropping the oily food according to any one of (1) to (5).

Effects of Invention

According to the present invention, it is possible to provide an oily food for frozen desserts that can impart an unprecedented crispy new texture, and in which not only thickening but also sticking is restrained.

DESCRIPTION OF EMBODIMENTS

Hereinafter, the present invention will be described in detail.

Oily Food for Frozen Desserts

The oily food for frozen desserts referred to in the present invention is an oily food for coating or covering a surface of dough of the frozen desserts, and is a food material in which fat and oil is a continuous phase and contains saccharides and the like as a dispersed phase and which is substantially free of water. Typical examples include ice-coated chocolates, and include not only chocolate, quasi-chocolate, and chocolate-utilizing foods defined by the Japan Fair Trade Council of Chocolate Industry and the Japan Fair Trade Council of Chocolate-Utilizing Foods, but also fat and oil processed foods containing oils and fats as essential components and containing auxiliary ingredients such as saccharides, milk powders, cocoa butter, fruit juice powder, fruit powder, taste materials, emulsifiers, flavors, and colorants at an arbitrary ratio.

Further, the frozen desserts mentioned herein are not particularly limited as long as they are low-temperature food materials to which the oily food for frozen desserts is combined. Examples include frozen fruit, ice cream bars, and ice desserts.

Saccharides

As described above, the oily food for frozen desserts needs to contain saccharides and the like as the dispersed phase in addition to the fat and oil in the continuous phase. The saccharides are not particularly limited, and examples thereof include sucrose, maltose, glucose, fructose, lactose, trehalose, and powdered maltose. Among them, those containing sucrose as a main component are preferred, and examples thereof include powdered sugar, brown sugar, white sugar, red sugar, Japanese refined sugar, white sugar, middle sugar, granulated sugar, superfine sugar, and tribasic sugar.

The lower limit of the blending amount of the saccharides is preferably 10 wt. % or more, more preferably 15 wt. % or more, and still more preferably 20 wt. % or more. The upper limit is preferably 74 wt. % or less, more preferably 70 wt. % or less, and still more preferably 65 wt. % or less. As the blending amount of the saccharides is increased, the oily food with a strong sweetness can be obtained, but in recent years, various flavors tend to be required, and quality with reduced sweetness may be required.

As the solid content other than the fat and oil, the lower limit value of the ratio of the saccharides in the solid content is preferably 13 wt. % or more, and more preferably 20 wt. % or more.

By containing an appropriate amount of an appropriate saccharide, the oily food for frozen desserts having good sweetness and flavor can be prepared.

Sucrose Fatty Acid Ester

The oily food of the present invention contains a sucrose fatty acid ester having an HLB of 3 or less. Not only is it effective in restraining thickening due to addition of moisture, but it is also possible to improve quality defects such as sticking caused by blending dextrins exhibiting the effect of restraining thickening. The blending amount is preferably 0.05 to 0.8 wt. %, more preferably 0.1 to 0.7 wt. %, and still more preferably 0.2 to 0.6 wt. %.

In the sucrose fatty acid ester used in the present invention, 50% or more of the constituent fatty acid is preferably an unsaturated fatty acid having 16 or more carbon atoms, and more preferably, 60% or more of the constituent fatty acid to be bonded is an unsaturated fatty acid having 16 or more carbon atoms. Examples of the unsaturated fatty acid having 16 or more carbon atoms constituting the sucrose fatty acid ester include oleic acid and erucic acid. When these fatty acids are used as a main constituent fatty acid of the sucrose fatty acid ester, an effect of restraining thickening and sticking is obtained. Thus, in the oily food for frozen desserts according to the present invention, it is possible to achieve quality with restrained thickening and sticking.

Dextrins

As a preferred embodiment of the oily food for frozen desserts, it is preferable to blend dextrins. The dextrins are obtained by hydrolyzing starch, and classified according to a dextrose equivalent (DE) value which is an index of the degree of hydrolysis, and the DE value of 20 or more is referred to as starch syrup, and the DE value of less than 20 is referred to as maltodextrin. Further, the DE value of 10 or less may be subdivided into dextrin.

The dextrins used in the present invention is a generic term for all hydrolyzed starches described above, and include dextrin, powdered sugar, starch hydrolysate, maltodextrin, and the like. The desired DE value is 33 or less, and more preferably 19 or less. When the DE value is too large, sticking tends to occur. The dextrins further preferably have a DE value of 4 or more, and more preferably 8 or more. When the DE value is too small, a gooey texture in the oral cavity, which is characteristic of dextrins, is likely to occur.

When the dextrins are blended, it is preferable to adjust the content to less than 50 wt. % in the formulation. The blending amount is more preferably 45 wt. % or less, and still more preferably 40 wt. % or less. When the blending amount is too large, physical properties are improved, but the texture is gooey as the oily food, and the desired crispness cannot be obtained.

By blending an appropriate amount of dextrin, it is possible to obtain the oily food having crispness and restrained thickening.

Lecithin

In the oily food for frozen desserts of the present invention, the content of lecithin is preferably 0.05 wt. % or less. The content is more preferably 0.04 wt. % or less, and still more preferably 0.03 wt. % or less. The lecithin is contained in about 0.1 to 1.0% of a general chocolate, but the content of lecithin is preferably small in order to exhibit the effect of the present invention.

Oil Content, Oils and Fats

In the oily food for frozen desserts of the present invention, it is essential to blend oils and fats, but the content thereof needs to be 25 to 70 wt. %, preferably 28 to 70 wt. %, and more preferably 30 to 68 wt. %. When the content is less than the lower limit, the viscosity increases and the fluidity decreases, and thus it is difficult to use for coating applications. When the content exceeds the upper limit, the solid content is insufficient, the flavor expression is poor, and the quality is strongly oily.

The oils and fats used in the oily food for frozen desserts of the present invention is not particularly limited as long as it can be used for the frozen desserts. Examples of raw ingredients include: vegetable fats and oils such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, sal fat, cacao fat, coconut fat, and palm kernel oil; animal fats and oils such as milk fat, beef fat, lard, fish oil, and whale oil; and processed fats and oils obtained by hydrogenation, fractionation, interesterification, and the like of these fats and oils. The melting point of such oils and fats may be appropriately selected so that desired functions depending on the product, such as solidification speed, cracking resistance, and surface gloss are imparted to the coating on the frozen desserts.

Moisture

In the present invention, the moisture is preferably 5 wt. % or less, more preferably 3 wt. % or less, and most preferably 1.5 wt. % or less with respect to the total amount of the oily food for frozen desserts. The moisture contained in the oily food is derived from the raw ingredients to be blended. Since the present invention addresses a case where the moisture is mixed into the oily food, an increase in viscosity at the time of moisture contamination is restrained even when the initial moisture is somewhat high. However, since the imparted function is removed by the unnecessarily existing moisture, it is desirable that the initial moisture be as low as possible.

Examples of formulations other than the oils and fats, sugars, and dextrins to be used in the oily food for frozen desserts of the present invention include: dairy products such as whole fat powder, nonfat powder, cream powder, whey powder, and butter milk powder; cacao components such as cacao mass, cocoa powder, and adjusted cocoa powder; cheese powder; coffee powder; and fruit juice powder. Further, vanillin, a fragrance, an acidulant, and pigments can be appropriately used for adjusting the flavor and color tone.

Emulsifier

The oily food for frozen desserts of the present invention may contain various emulsifiers other than lecithin for adjusting viscosity and oil crystallinity in addition to the sucrose fatty acid ester having an HLB of 3 or less. Examples of the emulsifiers include glycerin fatty acid ester, polyglycerol fatty acid ester, and sorbitan fatty acid ester.

Method for Using Oily Food for Frozen Desserts

The oily food for frozen desserts of the present invention is mainly used for coating applications, but is not particularly limited to a combination method as long as it is a combination with the frozen desserts. As an example, in addition to the coating, there are dropping and kneading to the ice cream in a fluidized state, a line drawing method, and the like. Among them, the effect of the present invention is particularly likely to be exhibited in the coating by dipping in which the moisture is likely to be mixed, because the moisture condensed on the surface of the frozen dessert in a frozen state of the core material is directly mixed into the chocolate. Even with other combination methods, the frozen dessert is prone to dew condensation, and the moisture is likely to be mixed into the oily food from the working environment, so that the effect can be obtained.

As a combination condition, similarly to a normal oily food for frozen desserts, the oily food for frozen desserts is melted in a water bath at 40° C. to 50° C. Then, the product temperature is lowered to around 40° C. and the oily food is combined with the frozen dessert by a method such as dipping or coating.

Particle Size

As for the method for measuring the particle size, measurement with a micrometer, which is relatively common among manufacturers of oily foods, is used to define the particle size of the present invention.

More specifically, the melted oily food is adhered to the measurement surface with a micrometer (for example, trade name "Digimatic standard external micrometer MDC-M" manufactured by Mitutoyo Corporation), and the measurement surfaces are brought close to each other. The adhesion amount of the oily food is an amount to the extent that a width of a micrometer measurement surface is reduced at the time of measurement and the oily food protrudes from the measurement surface when the measurement value is indicated. The aforementioned adhesion amount is measured at least to the extent that the oily food is uniformly distributed on the measurement surface. When the amount is small, a sufficient amount of particles do not exist in a gap between the measurement surfaces, and a measurement error is likely to occur. Thus, when the particle does not protrude from the measurement surface, the value is not used as a measurement value.

After the measurement, the measurement surface was brought into a clean state, and the measurement was performed again five times in the same procedure.

The more the number of particles having a micrometer measurement value of 50 μm or more, the more crispness is obtained. The particle size of the present invention is preferably 50 μm or more, more preferably 60 μm or more, and still more preferably 70 μm or more. The crispness is felt as the particle size is larger, but the particle size is preferably 0.5 mm or less in order to obtain constant fluidity for coating and uniform composition after coating. The particle size is more preferably 0.4 mm or less, and still more preferably 0.3 mm or less. When a large amount of particles of 0.5 mm or more is present, presence of edible food having the particle size is recognized, and the texture is different from the crispness.

EXAMPLES

Hereinafter, the present invention will be described in more detail with reference to Examples of the present invention. Note that in the Examples, % and parts are both based on weight.

<Examination 1>

According to the formulation in Table 1, oily foods for frozen desserts were prepared in the following procedure.

Each sample was prepared by mixing solid contents such as saccharides, and oils and fats to which soy lecithin was added, using a vertical mixer.

Thereafter, each oily food was temperature-controlled to 40° C., the viscosity at this time point was measured (viscosity without addition of water), then 0.5 wt. % of water was added and stirred, and the temperature was controlled to 40° C. to measure the viscosity (viscosity with addition of water). ABM-type viscometer was used for measurement of the viscosity with a No. 3 rotor at 30 rpm.

Separately, 200 g of an oily food to be a target was filled in 500 ml of a lidded square can, and left to stand and stored in an incubator at 40° C. for 3 days. Thereafter, the can was shaken 100 times and mixed, then the oily food was taken out, and a sticking substance remaining in the can was checked.

TABLE 1

| parts by weight | Comparative Example 1 | Comparative Example 2 | Reference Example 1 |
|---|---|---|---|
| Sugar | 60 | 30 | — |
| Dextrin A | — | 30 | 60 |

TABLE 1-continued

| parts by weight | Comparative Example 1 | Comparative Example 2 | Reference Example 1 |
|---|---|---|---|
| Soybean oil | 20 | 20 | 20 |
| Coconut oil | 20 | 20 | 20 |
| Soy lecithin | 0.1 | 0.1 | 0.1 |
| Particle size: measured average value (μm) Variation range in parentheses | 153 (138 to 170) | 131 (105 to 163) | 91 (84 to 97) |
| Oil content (%) | 40.0 | 40.0 | 40.0 |
| Viscosity at temperature controlled to 40° C. (cP) | 525 | 422 | 1095 |
| Viscosity with addition of moisture of 0.5% (cP) | Not measurable | 806 | 1458 |
| (Viscosity with addition of water)/(Viscosity without addition of water) | — | 1.9 | 1.3 |
| Storage at 40° C. for 3 days | No sticking | Sticking | Sticking |
| Crispness | Good | Good | Poor |

Dextrin A: maltodextrin trial product (DE value 16 to 18)

Soybean oil: trade name "refined soybean oil", manufactured by Fuji Oil Co., Ltd.

Coconut oil: trade name "refined coconut oil", manufactured by Fuji Oil Co., Ltd.

As described in Table 1, Comparative Example 1 using sugar had a very high viscosity when water was added. The viscosity increase was improved by blending dextrin A, but the sticking substance that was difficult to recover remained at the bottom when stored at 40° C.

It has become clear that the oily food for frozen desserts having a new texture needs to be improved in sticking when the oily food is stored in a melted state while restraining thickening.

In order to achieve restraining of thickening due to moisture contamination at the time of use and improvement of sticking at the time of storage in a melted state, the following criteria were set.

<Evaluation of Thickening Due to Moisture Contamination>

In the same manner as in Examination 1, the temperature was adjusted to 40° C., 0.5 wt. % of water was added and stirred, the temperature was adjusted again to 40° C., and the measured viscosity was evaluated as follows.

The viscosity was measured using the BM type viscometer.

Pass or fail was determined based on the following thickening rate.

Good: (viscosity with addition of water)/(viscosity without addition of water) is 2.5 or less Poor: (viscosity with addition of water)/(viscosity without addition of water) is more than 2.5

<Evaluation of Sticking Amount During Storage>

As studied in a preliminary experiment, 200 g of oily food was filled in 500 ml of a lidded square can, and left to stand in an incubator at 40° C. for 3 days. After the can was shaken 100 times and mixed, the oily food was taken out, and a sticking amount remaining in the can was measured.

Good: sticking amount is 9% or less

Poor: sticking amount is more than 9%.

The following sensory evaluation was performed by sensory evaluation of five panelists.

<Evaluation of Texture (Crispness)>

Good: characteristic crispness is well felt

Average: crispness is felt, but slightly weak

Poor: texture such as gooeyness different from crispness is strongly felt

<Flavor>

Good: good sweetness and melting in the mouth

Average: acceptable level, but sweetness and melting in the mouth are difficult to perceive Poor: oily feeling is strongly felt <Examination 2>

According to the formulation in Table 2, oily foods for frozen desserts were prepared in the following procedure similar to that in Examination 1.

Each sample was prepared by mixing solid contents such as saccharides, and oils and fats to which soy lecithin or sucrose fatty acid ester was added, using a vertical mixer.

As the sucrose fatty acid ester, a sucrose fatty acid ester with a constituent fatty acid having an HLB of 2 mainly containing erucic acid that is an unsaturated fatty acid was used. ("RYOTO Sugar Ester ER-290" manufactured by Mitsubishi-Chemical Foods Corporation)

The viscosity was measured with a No. 2 rotor of a BM type viscometer at 30 rpm.

TABLE 2

| parts by weight | Comparative Example 4 | Comparative Example 5 | Example 1 | Example 2 | Comparative Example 6 |
|---|---|---|---|---|---|
| Sugar | 50 | 25 | 50 | 25 | — |
| Dextrin A | — | 25 | — | 25 | 50 |
| Soybean oil | 25 | 25 | 25 | 25 | 25 |
| Coconut oil | 25 | 25 | 25 | 25 | 25 |
| Soy lecithin | 0.3 | 0.3 | — | — | — |
| Sucrose fatty acid ester (HLB2) | — | — | 0.3 | 0.3 | 0.3 |
| Particle size: measured average value (μm) Variation range in parentheses | 192 (149 to 235) | 145 (121 to 184) | 164 (141 to 190) | 126 (111 to 151) | 81 (79 to 85) |
| Oil content (%) | 49.9 | 49.9 | 49.9 | 49.9 | 49.9 |
| Viscosity at temperature controlled to 40° C. (cP) | 196 | 190 | 171 | 231 | 272 |
| Viscosity with addition of moisture of 0.5% (cP) | 541 | 262 | 354 | 258 | 304 |
| (Viscosity with addition of water)/(Viscosity without addition of water) Thickening evaluation | 2.8 Poor | 1.4 Good | 2.1 Good | 1.2 Good | 1.1 Good |
| Storage at 40° C. for | 5.1 | 10 | 7.9 | 5.8 | 6.5 |

TABLE 2-continued

| parts by weight | Comparative Example 4 | Comparative Example 5 | Example 1 | Example 2 | Comparative Example 6 |
|---|---|---|---|---|---|
| 3 days (%) | | | | | |
| Sticking amount evaluation | Good | Poor | Good | Good | Good |
| Flavor | Good | Good | Good | Good | Average |
| Crispness | Good | Good | Good | Good | Poor |

In Comparative Examples 4 and 5 in which the soy lecithin was added, there was a problem in thickening or sticking amount. However, in Examples 1 and 2 in which an erucic acid-based sucrose fatty acid ester was added, good physical properties with improved thickening and sticking were obtained. In addition, both the crispness and flavor were good. In Comparative Example 6 in which the solid content was dextrin A, there was no problem in thickening and sticking, but the gooeyness was felt and the crispness was weak.

<Examination 3>

According to the formulation in Table 3, oily foods for frozen desserts were prepared in the following procedure similar to that in Examination 1.

Each sample was prepared by mixing solid contents such as saccharides, and oils and fats to which sucrose fatty acid ester was added, using a vertical mixer.

The viscosity was measured with a No. 2 rotor at 30 rpm using a BM type viscometer. However, in Table 3, ※1 was measured with a No. 3 rotor at 12 rpm, and ※2 was measured with a No. 3 rotor at 30 rpm.

mm) temperature-adjusted to −18° C. was dipped up to a stick portion of wood in a glass beaker filled with an oily food that had been adjusted to 40° C. by being heated and melted to be coated with the oily food, and then subjected to flavor and texture tests.

TABLE 4

| | Example 1 | Example 2 | Example 3 | Example 7 |
|---|---|---|---|---|
| Flavor and texture | sweetness, crispness both good | sweetness, crispness both good | heavily coated and crispness is strongly felt | coating amount is small, crispness is weakened, but unprecedented texture |

As described in Table 4, all of Examples 1, 2, 3, and 7 had a new texture different from that of the conventional oily food for frozen desserts.

TABLE 3

| parts by weight | Example 3 | Example 4 | Example 5 | Example 6 | Example 7 | Comparative Example 7 |
|---|---|---|---|---|---|---|
| Sugar | 28.0 | 26.0 | 24.0 | 14.0 | 12.0 | 10.0 |
| Lactose | 17.9 | 16.6 | 15.4 | 8.9 | 7.6 | 6.4 |
| Dextrin A | 24.1 | 22.4 | 20.6 | 12.1 | 10.4 | 8.6 |
| Soybean oil | 15.0 | 17.5 | 20.0 | 32.5 | 35.0 | 37.5 |
| Coconut oil | 15.0 | 17.5 | 20.0 | 32.5 | 35.0 | 37.5 |
| Sucrose fatty acid ester (HLB2) | 0.3 | 0.3 | 0.3 | 0.3 | 0.3 | 0.3 |
| Particle size: measured average value (μm) Variation range in parentheses | 193 (177 to 217) | 201 (141 to 222) | 184 (121 to 237) | 106 (91 to 121) | 83 (81 to 84) | 86 (81 to 92) |
| Oil content (%) | 29.9 | 34.9 | 39.9 | 64.8 | 69.8 | 74.8 |
| Viscosity at temperature controlled to 40° C. (cP) | 3550※1 | 1710※2 | 601 | 76 | 58 | 54 |
| Viscosity with addition of moisture of 0.5% (cP) | 5060※1 | 2924※2 | 627 | 81 | 58 | 52 |
| (Viscosity with addition of water)/ (Viscosity without addition of water) Thickening evaluation | 1.4 Good | 1.2 Good | 1.0 Good | 1.1 Good | 1.0 Good | 1.0 Good |
| Storage at 40° C. for 3 days (%) Sticking amount evaluation | 8.5 Good | 8.6 Good | 8.1 Good | 4.4 Good | 4.7 Good | 4.1 Good |
| Flavor | Good | Good | Good | Good | Average | Poor |
| Crispness | Good | Good | Good | Good | Good | Average |

Samples having different viscosities were prepared by adjusting the oil content, and each of them was evaluated. When the oil content increased to 75 wt. %, problems such as thickening and sticking were hardly observed, but the crispness was weakened, and the oily feeling was strongly felt.

<Examination 4>

The evaluation of the frozen desserts coated is described in Table 4. A commercially available quadrangular prism-shaped ice bar (trade name: vanilla bar, manufactured by Lotte Co., Ltd., outline of ice portion: 23 mm×23 mm×73

INDUSTRIAL APPLICABILITY

According to the present invention, it is possible to provide an oily food for frozen desserts which has an unprecedented new texture and is easy to handle.

The invention claimed is:

1. An oily food for frozen desserts, comprising a sucrose fatty acid ester having a hydrophilic-lipophilic balance (HLB) of 3 or less and saccharides, wherein a solid content particle size of the oily food for frozen desserts is 106 μm or more and 201 μm or less, and a content of oil molecules in the oily food for frozen desserts is 25 to 70 wt. %.

2. The oily food for frozen desserts according to claim 1, comprising dextrins.

3. The oily food for frozen desserts according to claim 1, wherein 50% or more of a constituent fatty acid in the sucrose fatty acid ester is an unsaturated fatty acid having 16 or more carbon atoms.

4. The oily food for frozen desserts according to claim 1, wherein a content of lecithin is 0.05 wt. % or less.

5. The oily food for frozen desserts according to claim 2, wherein a content of lecithin is 0.05 wt. % or less, and 50% or more of a constituent fatty acid in the sucrose fatty acid ester is an unsaturated fatty acid having 16 or more carbon atoms.

6. A frozen dessert coated with the oily food according to claim 3.

7. A method for imparting a crispy texture to frozen desserts, the method comprising coating, kneading, or dropping the oily food according to claim 1.

* * * * *